March 5, 1963 E. S. GREENLEE 3,079,722
FISH LURES
Filed June 20, 1960
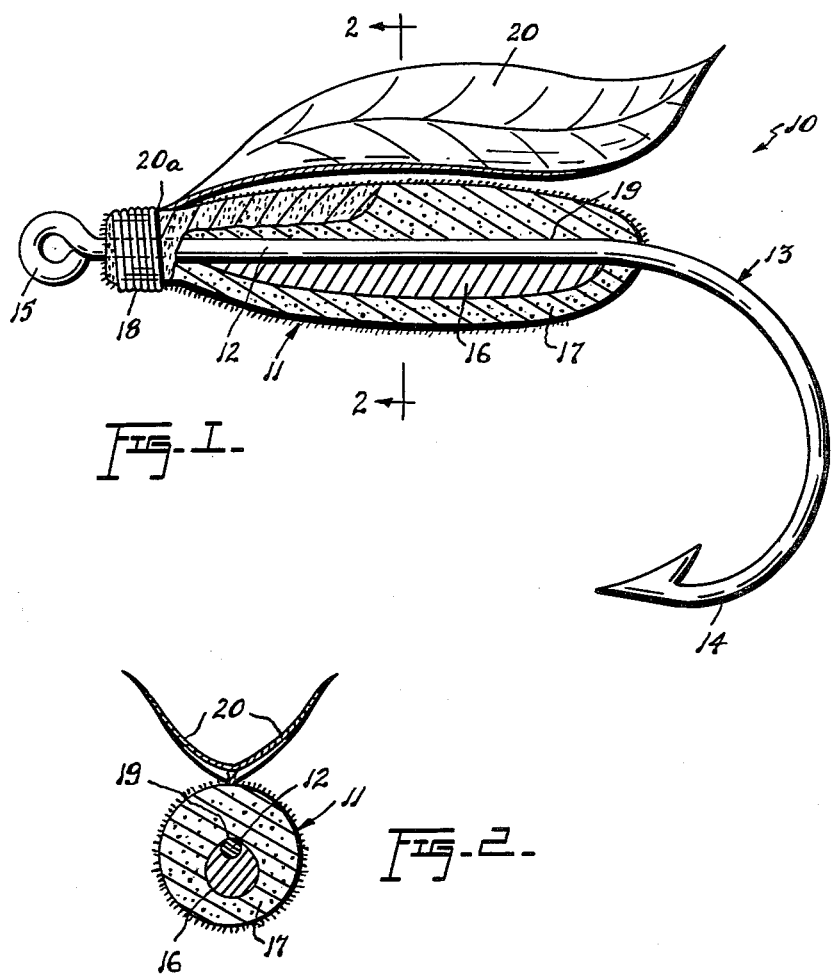
Inventor:
Eligya S. Greenlee

United States Patent Office 3,079,722
Patented Mar. 5, 1963

3,079,722
FISH LURES
Eligya S. Greenlee, St. Louis, Mo.
(4314 St. Dominic, St. Ann, Mo.)
Filed June 20, 1960, Ser. No. 37,206
1 Claim. (Cl. 43—42.06)

This invention relates to new and useful improvements in artificial fish lures, particularly those of the type commonly known as flies, wherein the body of the lure is carried by and partly encloses the hook.

The principal object of the invention is to provide an improved lure of this type which is highly effective for attracting and catching fish, not only by virtue of its appearance and movement when drawn through water, but also by a peculiar odor which it emits when submersed.

An important feature of the invention therefore resides in a novel structural arrangement of the body of the lure, while another important feature resides in the provision of means in the lure body for emitting the fish attracting odor, as above noted.

Some of the advantages of the invention reside in its simplicity of construction, efficient operation, and in its adaptability to convenient and economical manufacture.

With the above more important objects and features in view and such other objects and features as may become apparent as this specification proceeds, the invention will be understood from the following description taken in conjunction with the accompanying drawing, wherein like characters of reference are used to designate like parts, and wherein:

FIGURE 1 is a longitudinal sectional view of the fish lure in accordance with the invention, shown partly in side elevation; and FIGURE 2 is a cross-sectional view, taken substantially in the plane of the line 2—2 in FIGURE 1.

Referring now to the accompanying drawing in detail, the fish lure or fly in accordance with the invention is designated generally by the reference numeral 10 and embodies in its construction an elongated body 11 which is mounted on and encloses the shank 12 of a suitable fish hook 13, the latter also including the usual bill portion 14 and a line attaching eye 15.

The lure body 11 consists of an inner body portion 16 which extends longitudinally along the underside of the shank 12, that is, along the side of the shank oriented toward the bill 14, and an outer body portion 17 which encloses the shank as well as the body portion 16, the portion 16 being disposed eccentrically in the portion 17 as is best shown in FIGURE 2, so that the shank 12 extends substantially centrally or axially through the outer body portion 17.

The outer body portion 17 is of a conventional "fuzzy" form and is wound in place around the shank 12 and inner body portion 16, being ultimately secured by a thread or cord 18 in the usual manner. A coating of shellac, or the like, 19 is applied to the exposed portion of the shank 12 prior to the winding of the body portion 17 so as to assist in holding the same in position. However, such a shellac coating is not applied to the inner body portion 16 which, as hereinafter described, is adapted to emit a fish attracting odor and would not do so if a shellac coating were applied thereto.

A split chicken feather, or the like, 20 overlies the body 11 and is suitably anchored at its root end 20a in the winding of the outer body portion 17 and/or under the thread fastening 18, such a split feather providing, as is best shown in FIGURE 2, a pair of wing-like members which impart a realistic zig-zag motion to the lure when drawn through water.

The inner body portion 16 preferably consists of a mixture of the following ingredients:

Water
Yeast
Salt
Squirrel hair present in the proportions of approximately 1 pint of water, 1 oz. of yeast, one-half teaspoon of salt, and a quantity of squirrel hair such as may be cut from the tail of one squirrel. The mixture is prepared as follows:

After dicing the yeast into small cubes, it is baked in an oven until it becomes brittle, then rolled with a rolling pin into a powder form. The powdered yeast, salt and squirrel hair are then added to boiling water and boiled for approximately 15 minutes. The boiled mixture is then strained through a fine mesh screen and the squirrel hair so prepared is then applied to the shank 12 to constitute the body portion 16 of the lure.

When the lure is placed in use and becomes wet, the moisture penetrating through the outer body 17 impregnates the inner body 16 which, upon becoming moist, emits a peculiar odor which is very effective in attracting fish to the lure. This emission of odor decreases and ceases as the lure becomes dry, but becomes effective again during subsequent immersions, so that the odor producing effectiveness of the lure is not wasted while it is not in use.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claim.

What is claimed as new is:

A fish lure comprising in combination, a fish hook including a shank, an eye at one end and a bill portion extending laterally from the other end of said shank, an elongated lure body provided on said shank and including an elongated inner body portion of odoriferous material extending longitudinally on the side of the shank oriented toward the bill portion of said hook, an elongated outer body portion formed from material pervious to water and completely enclosing said inner body portion, said outer body portion having a substantially circular cross-section concentric with said shank and the inner body portion being disposed eccentrically in the outer body portion on the side of the shank oriented toward the bill portion of the hook, an elongated feather juxtaposed to said outer body portion, and thread fastening securing one end of said feather to the outer body portion at a point adjacent the eye of the hook, said feather being disposed on a side of said outer body portion opposite from the bill portion of said hook.

References Cited in the file of this patent
UNITED STATES PATENTS

| | | |
|---|---|---|
| 975,833 | Cox | Nov. 15, 1910 |
| 2,091,457 | Sauer | Aug. 31, 1937 |
| 2,246,428 | Berlew | June 17, 1941 |
| 2,611,206 | Harvey | Sept. 23, 1952 |
| 2,708,629 | Judy | May 17, 1955 |
| 2,743,185 | Tereski | Apr. 24, 1956 |
| 2,780,021 | Fagg | Feb. 5, 1957 |
| 2,836,001 | Silen | May 27, 1958 |